Aug. 29, 1933.  F. E. HOBSON  1,924,788
DEVICE FOR THE HEAT TREATING OF COMMINUTED MATERIALS
Filed Aug. 14, 1931  3 Sheets-Sheet 1
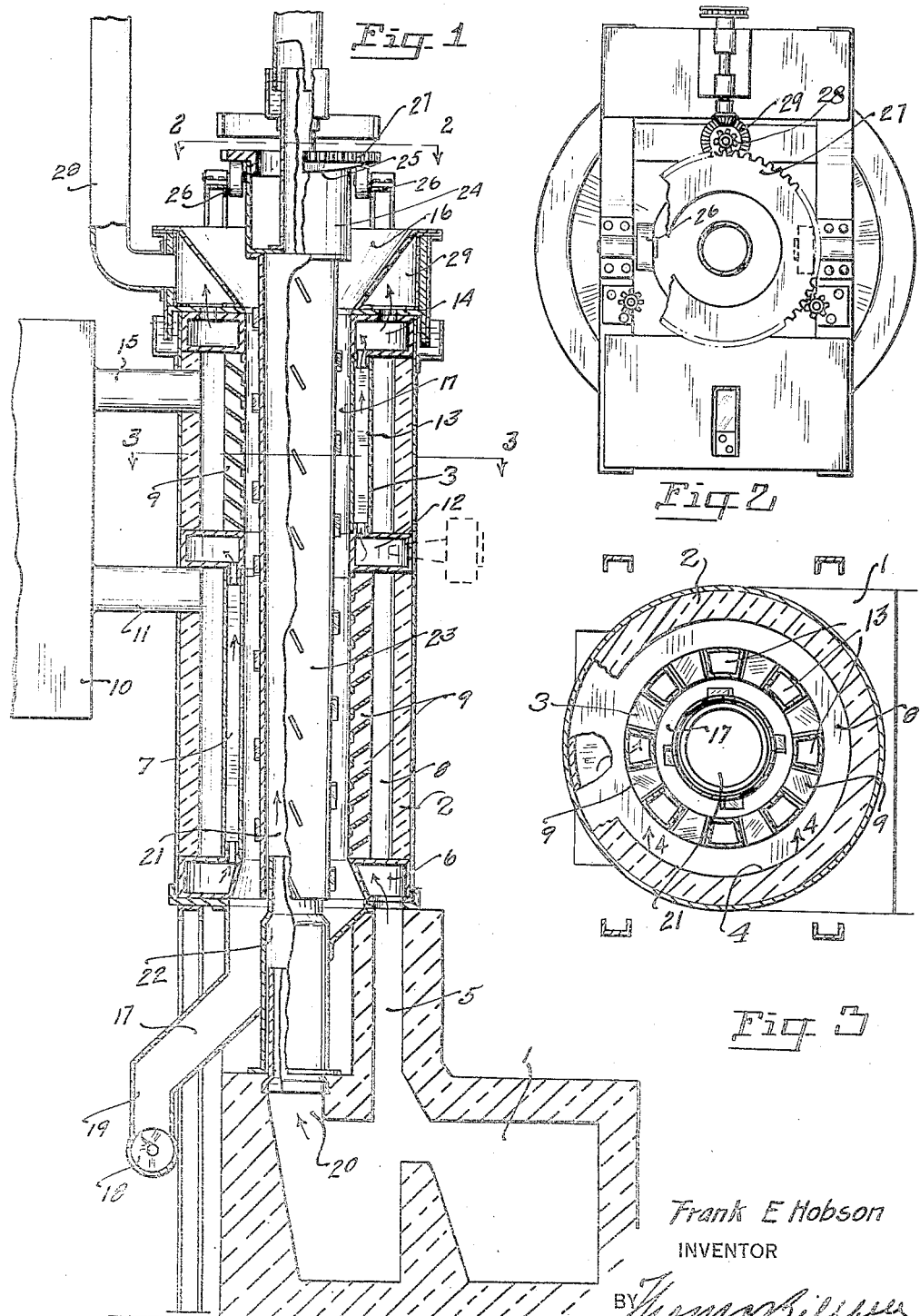
Frank E Hobson
INVENTOR

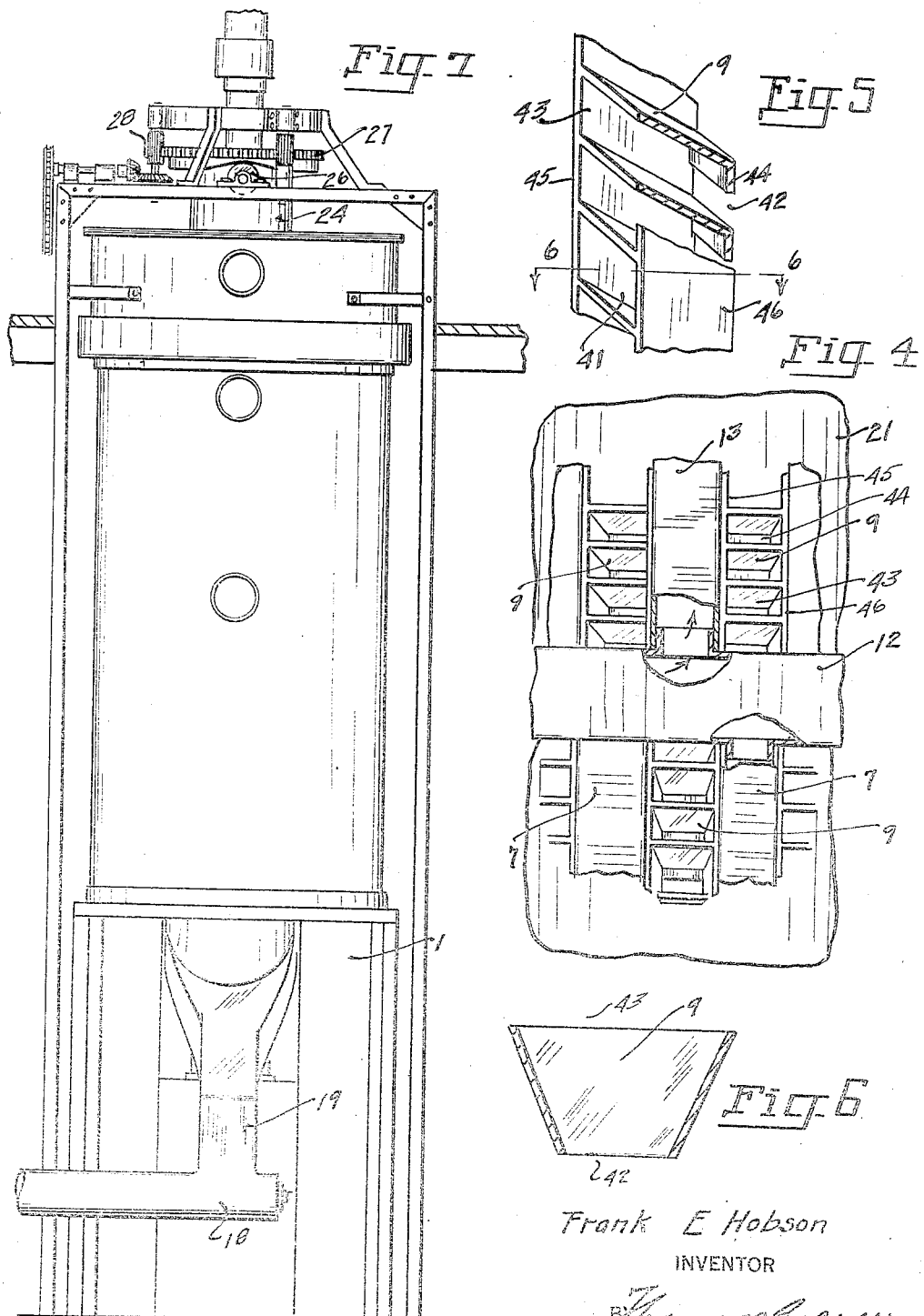

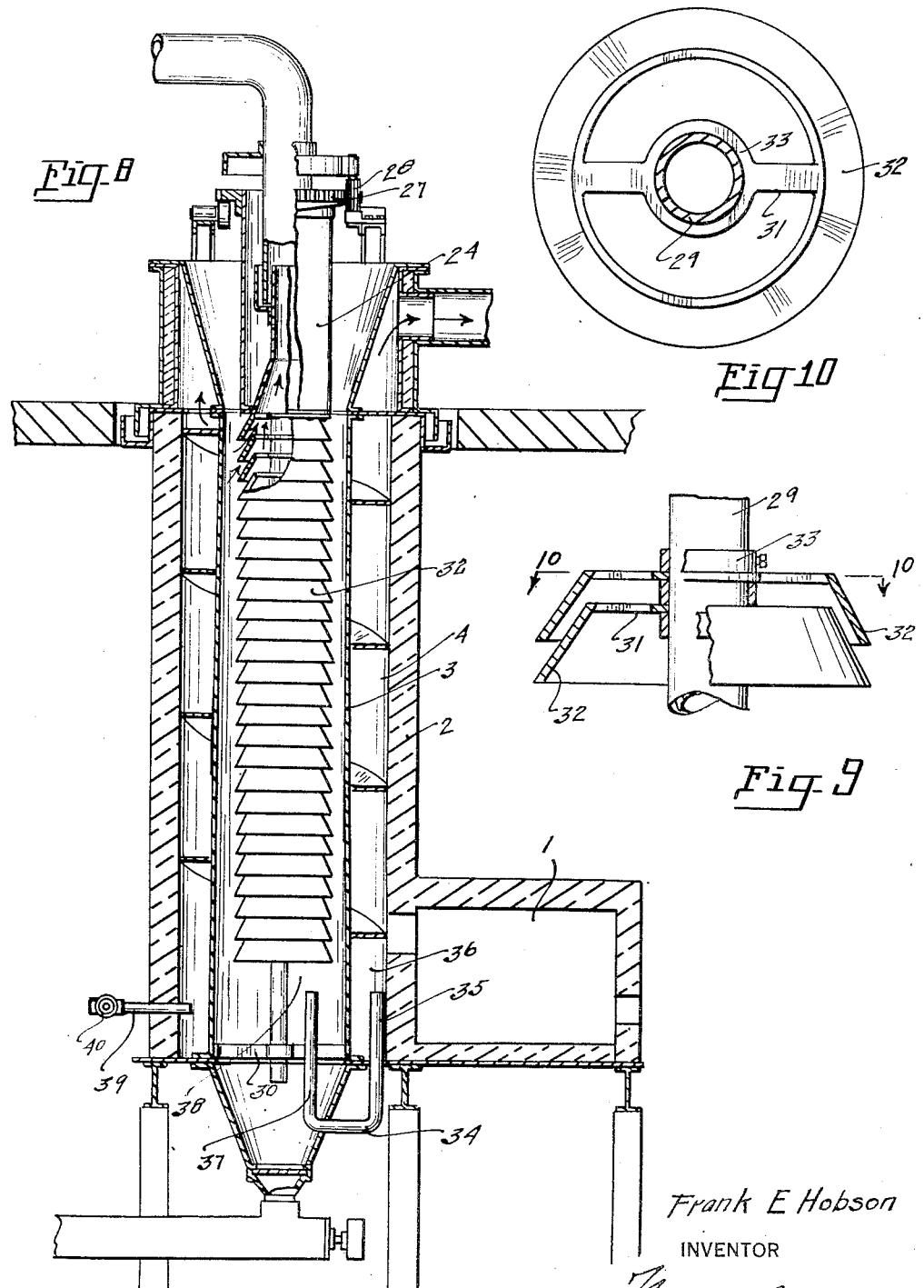

Patented Aug. 29, 1933

1,924,788

UNITED STATES PATENT OFFICE 1,924,788

DEVICE FOR THE HEAT TREATING OF COMMINUTED MATERIALS

Frank E. Hobson, Bellingham, Wash., assignor to Western Combustion Engineers, Inc., Portland, Oreg., a corporation of Oregon Application August 14, 1931. Serial No. 557,100

5 Claims. (Cl. 263—21)

The primary purpose and object of my invention consists in providing a machine for the treatment of certain classes of ores and primarily for the extracting of the content of the minerals disposed therein, that volatilize, and that may be precipitated in a condenser, after volatilization.

The device may be used in the treating of ores, coal and other comminuted materials and products.

The invention consists primarily of a vertically disposed treating chamber that is disposed adjacent a heat supplying furnace having an insulated jacket, so that heat may be developed within the furnace and be conducted directly into the drums and flues disposed upon the outer peripheral surface of the treating device. The cross-sectional area of the treating device is preferably made circular.

Means is also provided for the conducting of heat upwardly through the center of the device, in order that the material to be treated may be passed through two independently heated surfaces, preferably continuous, and lying in a vertical plane. The stream of the materials to be treated is fed into the top of the passageway and the same gravitates downward between heated surfaces in a stream that increases uniformly in cross-sectional area, in its downward movement of travel.

Louvered surfaces are disposed centrally of the device, that are depending from a support that has a uniformly up and down movement imparted thereto, simultaneously with its being rotated. Means being provided for the maintaining of the mass being treated in a heat zone in the absence of free air, with means for providing a negative atmospheric pressure within the treatment zone.

A further object of my invention consists in providing a device in which the heated surfaces, past which the materials being treated passes, is relatively large, in respect to the mass or volume of material being treated.

One of the objects of my invention consists in providing a device for the treatment of materials, in which the materials are required to pass heated surfaces, one of said surfaces being adapted for being rotated and for having an up and down movement imparted thereto, during the rotation.

A still further object of my invention consists in providing a heated zone, that uniformly increases in cross-sectional area from top to bottom, through which the materials to be treated, are required to pass.

A still further object of my invention consists in providing a heated zone through which materials to be treated may be passed, with means for creating a negative atmospheric pressure within the heated zone, during the passage of the material therethrough.

A still further object of my invention consists in providing a flue for the passing of heated gases therethrough, for heating a surface for heating, drying and carbonizing the mass to be treated. The gases are required to pass spirally about the surface to be heated.

Still further objects of my invention consist in providing a heated surface that is preferably circular in cross-sectional area, and that is adapted for having a jig and a gyratory movement, simultaneously imparted thereto.

A still further object consists in providing a device for the treating of materials in commercial quantities, wherein the device is adapted for absorbing the maximum amount of treating heat that is developed therewith.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a sectional, side elevation of the assembled device.

Fig. 2 is a sectional, top, plan view of the assembled device, the same being taken on line 2—2 of Fig. 1, looking in the direction indicated.

Fig. 3 is a sectional, top, plan view of the assembled device, the same being taken on line 3—3 of Fig. 1, looking in the direction indicated.

Fig. 4 is a fragmentary, sectional, side view of the assembled device, the same being taken on line 4—4 of Fig. 3, looking in the direction indicated.

Fig. 5 is a fragmentary, sectional, perspective, side view of the louvered portion of the device.

Fig. 6 is a sectional, top, plan view of the mechanism, illustrated in Fig. 5, the same being taken on line 6—6 of Fig. 5, looking in the direction indicated.

Fig. 7 is a side view of the assembled device.

Fig. 8 is a vertical, sectional, side view of a modified form of the device.

Fig. 9 is a fragmentary, sectional, side view of the louvered elements and of the supports for the same.

Fig. 10 is a sectional, plan view of the mechanism illustrated in Fig. 9, the same being taken on line 10—10 of Fig. 9, looking in the direction indicated.

Like reference characters refer to like parts throughout the several views.

My invention is intended to be used in conjunction with a heat supplying furnace 1. The device is primarily comprised of a masonry outer shell 2 and a relatively stationary inner shell 3, that is spaced apart from the inner wall 4 of the masonry shell 2. A flue is formed between the masonry shell and the stationary shell.

In the embodiment as illustrated in Fig. 1, a secondary flue 5 is disposed between the furnace 1 and a manifold 6. The manifold 6 has a plurality of spaced tubes 7 upwardly extending therefrom and disposed about the periphery of the masonry shell.

Louvers 9 extend through a side wall of the shell and deliver the volatile components from the materials being treated into the annular flue 8.

A subatmospheric pressure is created within the device through a subatmospheric pressure being created within the condensing chamber 10.

An intercommunicating connection is formed between the condenser 10 and the flue 8 by a connecting pipe 11. A secondary manifold 12 is disposed at the top of the flue 8 and secondary flues 13 are disposed between the manifold 12 and a manifold 14.

A subatmospheric pressure is also created within the superstructure, disposed above the manifold 12 and the pipe 15, that connects the condenser 10 with the interior of the assembly.

The materials to be treated are delivered into a hopper 16 and the same gravitate downward into and through the treating passageway 17. The material passageway is made relatively narrow and increases in cross-sectional area from the top, or feeding end to the bottom, or delivery end, to thereby subject a greater volume, or mass of material to the heat as the same is fed downward.

A delivery chute 17 leads from the base of the treating chamber into a screw delivery 18, that is disposed at the bottom of the chute 19 that terminates the lower end of the delivery chute 17.

A secondary flue 20, leads from the furnace and delivers heat from the furnace into the vertically disposed passageway 21, that is disposed centrally, and longitudinally of the device.

A stack connection 22 leads from the flue 20 to the passageway 21 and an up and down movement is imparted to the shell 23; the stack connection 22 is preferably restricted somewhat upon its upper end, to form a proper working relationship between the stack connection 22 and the shell 23; the shell 23 forms the inner surface against which the material, or mass to be treated is heated. The shell is suspended from the support 24.

A cam 25 is disposed upon the outer surface of the support 24 and is secured thereto; the cam rests directly upon a plurality of supporting rollers 26. A gear 27 forms the upper end of the support 24 and a pinion 28A coacts with the gear 27 and rotates the gear 27 as it is rotated. The shell 23 is also rotated as the shell and gear rotates.

An up and down movement is imparted to the shell simultaneously with the same being rotated, to thereby impart a gyratory jig movement to the shell, the mass being treated is therefore subjected to heat from the heated surfaces past which it flows.

A stack 28 leads directly to the manifold 14 and the header 29 exhausts the wasted heat passing upward through the various flues.

Since the elements that are volatilized at relatively low temperatures are the first to be eliminated from the mass being treated, which are quite largely water vapors, the same pass off through the outlets 11 and 15, and since the volatile components requiring greater heat are volatilized at higher temperatures, the same are withdrawn from the device through the pipe connections 11 and 15 and are delivered into the condenser 10.

A cross section of the louvers illustrated in Fig. 8 is illustrated somewhat in detail in Fig. 9, and when so made, the supporting tube 29, upon which the bell shaped louvers are assembled passes through an alignment spider 30, disposed at the lower end of the tube. The purpose is to maintain the louver assembly in precise position and alignment. The louvers are preferably made having a substantially horizontal central portion 31 and having frusto-conical side walls 32. The hub 33 of each louver is adapted to maintain the units in spaced relationship with each other.

A U-shaped tube 34 illustrated in Fig. 8 is disposed through the base of the assembly and one leg 35 of the U terminates within the outer heat passageway 36, the other of the legs 37 terminates within the central heat zone 38, to thereby maintain a balanced relationship of pressure between the respective heat zones. A pipe 39 leads through the wall 2 and a valve 40 is disposed within the pipe. The purpose of the pipe is to facilitate the delivery of a normal amount of free air under pressure if necessary into the heat zones, to permit a partial combustion of the products when it is deemed advisable to do so.

In Figs. 4 and 5 I have illustrated a modified form of construction and in this form the volatiles driven off, pass outward through the louvered openings 41. The surfaces of the louvers are inclined upwardly from the entrance end 42 to the discharge end 43. A skirt 44 extends from the entrance end of the inclined surfaces to restrict the opening at the entrance end of the passageway. The walls 45 and 46 should be spaced apart, only sufficiently to permit the heat to flow across the inclined surfaces, to thereby maintain a heat zone, of maximum operation intensity.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What I claim is:

1. In a device of the class described, the combination of a plurality of concentrically mounted substantially cylindrical shells of different diameters superposed on the base of the furnace, one of said shells having a slightly increasing diameter from top to bottom, the space between the shells forming a passageway uniformly increasing in cross sectional area downward, means for movably suspending the inner shell centrally of the outer shell, said outer shell being stationary, the lower end of the suspended shell slidably engaging a guide for maintaining the shell in precise axial alignment with the stationary shell, means associated with the suspending means for the upper end of the inner shell for imparting an up and down and rotary movement thereto, one of the side walls of said passageway being louvered, and means for heating the inner and outer walls of the passageway.

2. In a device of the class described, the combination of a furnace, a plurality of substantially cylindrical and concentrically mounted shells of different diameters superposed on the base of the furnace and spaced apart to form a passageway therebetween that increases in cross sectional area uniformly from the top to the bottom, manifolds adapted for the transference of heat from the furnace to material being treated, means for movably suspending the inner shell centrally of the outer shell, said outer shell being stationary, means for creating a subatmospheric pressure within the passageway, means for imparting an up and down movement and a rotary movement simultaneously to one of the shells, the side walls of one of the shells being louvered, and means for conducting materials from the passageway in a subatmospheric pressure.

3. In a device of the class described, the combination of a furnace having substantially cylindrical shells of different diameters concentrically mounted and superposed on the base of the furnace, one of said shells having its diameter slightly increasing toward the bottom, said shells adapted to permit the passage of heat therethrough, a pipe adapted to feed compressed air into a chamber through which the products of combustion pass from the furnace through the shells, a valve adapted to control the amount of air so fed, means for tapping off the treated material passing through a passageway disposed between the shells, a funnel-shaped mouth adapted to lead material into the upper end of the passageway disposed between the shells, and means for simultaneously imparting an up and down and rotary movement to one of the shells, and means for creating a subatmospheric pressure between the shells.

4. In a device of the class described, the combination of concentrically mounted substantially cylindrical shells of different diameters spaced apart to form a passageway for materials to be treated therebetween, one of the shells being stationary, said passageway being open at its upper end and having means at its lower end for conveying the treated material out from the furnace, means for simultaneously imparting an up and down movement and a rotary movement to one of the shells, and means for heating the shell walls disposed adjacent the treating passageway.

5. In a device of the class described, the combination of concentrically mounted substantially cylindrical shells of different diameters and spaced apart one within the other to form a treating passageway for the heat-treating of materials disposed between the respective shells, means for spirally conducting about one of the shells the products of combustion from a furnace associated therewith, means for feeding the materials being treated from the passageway, and means for simultaneously imparting a rotary movement and an up and down movement to one of the shells for collecting and removing the volatile elements from the materials being heat treated.

FRANK E. HOBSON.